United States Patent [19]

Pierlartzik et al.

[11] Patent Number: 5,084,549
[45] Date of Patent: Jan. 28, 1992

[54] LIQUID CRYSTALLINE COMPOUNDS, THEIR PRODUCTION AND THEIR USE AS MODIFIERS FOR POLYCARBONATES, POLYESTER CARBONATE AND POLYESTERS

[75] Inventors: Harald Pierlartzik; Rolf-Volker Meyer; Ralf Dujardin, all of Krefeld; Axel Schnitzler, Langenfeld; Hans-Joachim Traenckner, Krefeld, all of Fed. Rep. of Germany

[73] Assignee: Bayer Aktiengesellschaft, Leverkusen, Fed. Rep. of Germany

[21] Appl. No.: 643,462

[22] Filed: Jan. 18, 1991

Related U.S. Application Data

[62] Division of Ser. No. 377,320, Jul. 10, 1989, abandoned.

[30] Foreign Application Priority Data

Jul. 19, 1988 [DE] Fed. Rep. of Germany ....... 3824365

[51] Int. Cl.[5] .............................................. C08G 63/197
[52] U.S. Cl. .................... 528/176; 528/184; 528/185; 528/190; 528/191; 528/193; 528/194; 528/196; 525/390; 525/394; 525/397; 525/437; 525/439
[58] Field of Search ............... 528/176, 184, 185, 190, 528/191, 193, 194, 196; 525/390, 394, 397, 437, 439

[56] References Cited

U.S. PATENT DOCUMENTS

4,451,611  9/1984  Cincotta et al. ..................... 525/51
4,650,836  3/1987  George et al. ..................... 525/444
4,791,187  2/1988  Suling et al. ........................ 528/60

FOREIGN PATENT DOCUMENTS

0030417  6/1981  European Pat. Off. .
0256470  12/1988  European Pat. Off. .

OTHER PUBLICATIONS

Journal of the Chemical Society-Perkin Transactions II, Physical Organic Chemistry, 6:713-717 (1976).
Journal of the Am. Chem. Soc., 95:621-776 (1973).
Chemical Abstracts, 79:145478c, (1973; 22:285-299 (1973).
Chemical Abstracts, 104:110582q (1986).

*Primary Examiner*—John Kight, III
*Assistant Examiner*—S. A. Acquah
*Attorney, Agent, or Firm*—Connolly & Hutz

[57] ABSTRACT

The present invention relates to aromatic compounds corresponding to formula (I)

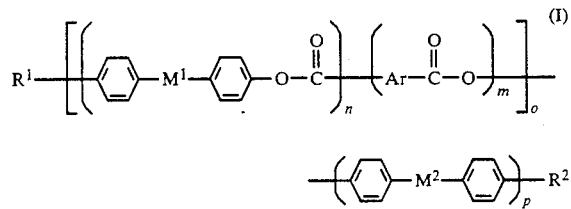

to their production and to their use as modifiers for thermoplastic aromatic polycarbonates and/or thermoplastic aromatic polyester carbonates and/or thermoplastic aromatic polyesters.

3 Claims, No Drawings

LIQUID CRYSTALLINE COMPOUNDS, THEIR PRODUCTION AND THEIR USE AS MODIFIERS FOR POLYCARBONATES, POLYESTER CARBONATE AND POLYESTERS

This is a division of application Ser. No. 377,320 filed July 10, 1989, now abandoned.

This invention relates to aromatic compounds corresponding to formula (I)

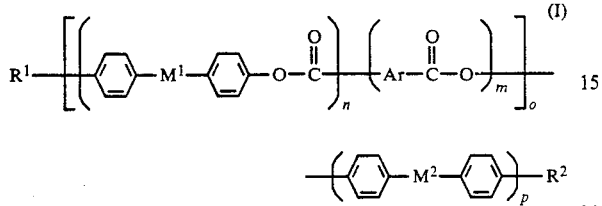

in which
- Ar is an aromatic group which may be mononuclear or polynuclear; the polynuclear radical may be attached by one bond or anellated,
- $R^1$ and $R^2$ may be the same or different and represent H, chlorine, O—$C_{1-4}$-alkyl, —O—$C_{3-6}$-cycloalkyl, O—$C_{6-14}$-aryl, $C_{1-4}$-alkyl, $C_{3-6}$-cycloalkyl, $C_{6-14}$-aryl, fluorinated $C_{1-4}$-alkyl, fluorinated $C_{3-6}$-cycloalkyl, fluorinated $C_{6-14}$-aryl or a group corresponding to formulae (I) a) to l) below:

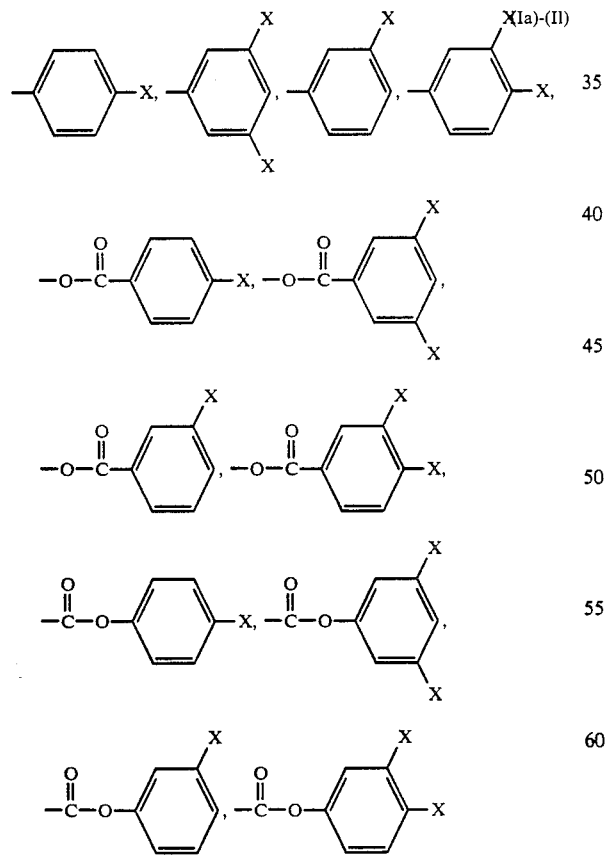

where X again represents the substituents from H to fluorinated $C_{6-14}$-aryl mentioned above for $R^1$ and $R^2$; —$M^1$ and —$M^2$ may be the same or different and represent groups with two bonds corresponding to formulae (I.1) to (I.11)

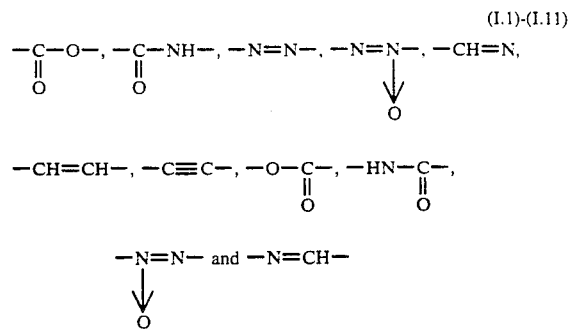

and
- $m = 0$, 1 or 2,
- $n = 1$ or 2,
- $o = 1, 2$ or 3 and
- $p = 0$ or 1; where $p = 0$,
- $R^2$ can only be (Ia), (Ib), (Ic) or (Id), excluding compounds nos. 1, 2 and 10 on pages 4 and 6 of the present application.

Preferred groups —Ar— are the groups (Ar1) to (Ar4)

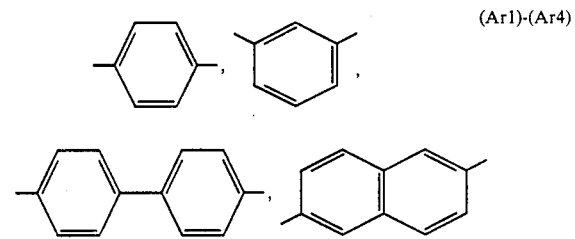

Preferred substituents $R^1$ and $R^2$ are H, $CH_3$, $OCH_3$, cyclohexyl, phenyl, $CF_3$, $OCF_3$, fluorinated cyclohexyl and fluorinated phenyl.

Preferred groups -M- are (I.1), (I.2), [I.5], (I.8), (I.9) and (I.11).

Preferred index combinations m, n, o, p and q are
- $m=0, n=1, o-1, p=0$;
- $m=0, n=1, o=1, p=1$;
- $m=0, n=2, o=1, p=1$;
- $m=n=o=p=1$;
- $m=1, n=1, o=2, p=1$;
- $m=0, n=2, o=1, p=0$;
- $m=1, n=2, o=1, p=1$ and
- $m=1, n=1, o=3, p=1$.

The compounds corresponding to formula (I) are distinguished by the fact that, on melting, they pass through a liquid crystalline phase. (For liquid crystalline compounds and phases, see for example D. Demus, L. Richter, Textures of Liquid Crystals, Verlag Chemie, Weinheim - N.Y., 1978, or H. Kelker, R. Hatz, Handbook of Liquid Crystals, Verlag Chemie, Weinheim, Deerfield 1080).

The following four groups of compounds (I,A) to (I,D) are mentioned as examples of compounds corresponding to formula (I):

(I,A) liquid crystalline compounds corresponding to formula (I) with three aromatic partial structures, in which
$m=0, n=1, o=1$ and $p=0$, compounds 1 and 2 already being known from the literature (D. B. Schroeder, J. Org. Chem. 38, 3160 (1973) and J. P. Van Meten, B. H. Klanderman, Mol. Cryst., Liquid Cryst. 1973, Vol. 22, pages 285 et seq.)

(I,B) liquid crystalline compounds corresponding to formula (I) with four aromatic partial structures, in which m=0, n=1, o=1 and p=0:

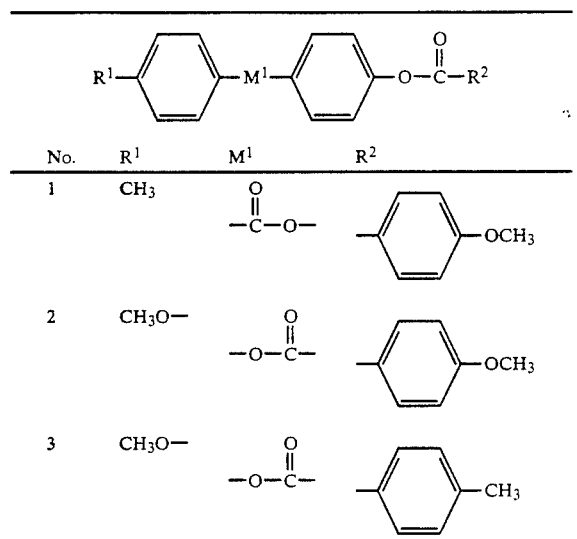

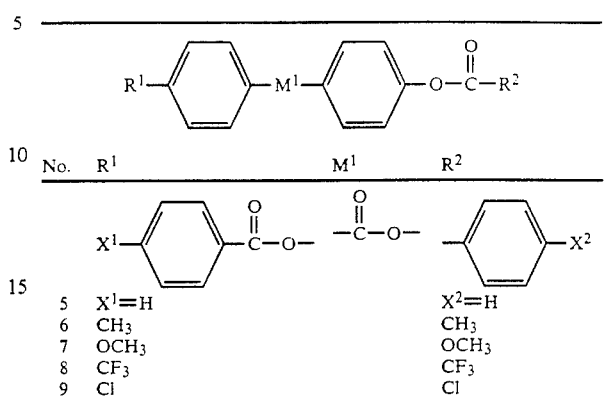

(I,C) liquid crystalline compounds corresponding to formula (I) with five aromatic partial structures, in which m=n=o=p=1.

Compound 10 has already been mentioned in the literature, cf. V. N. Tsvetkov, Eur, Polym. J. Vol. 21 no. 11, page 933 (1985).

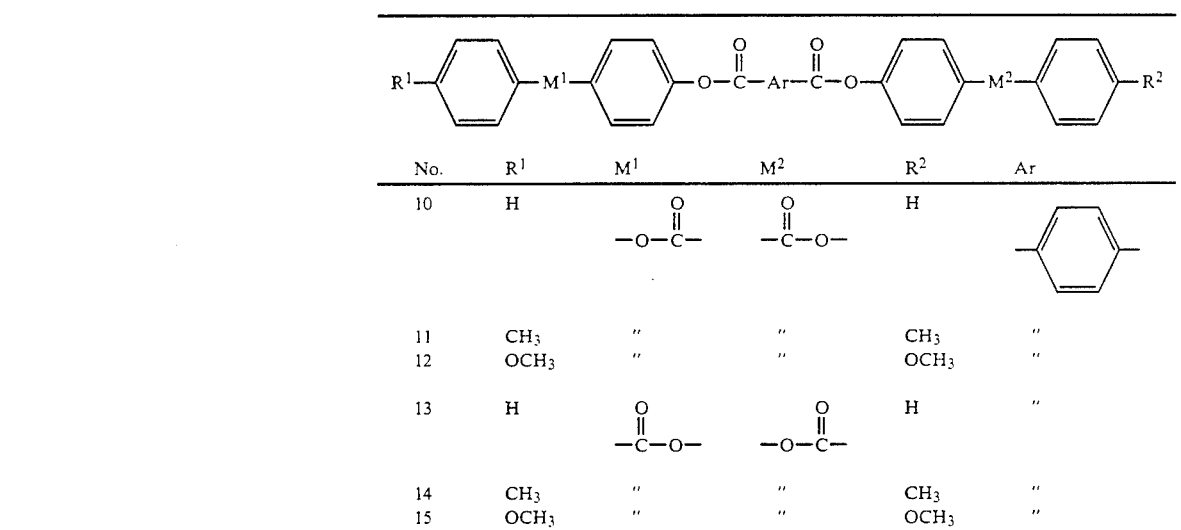

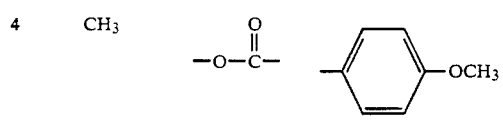

(I,D) liquid crystalline compounds corresponding to formula (I) with seven aromatic partial structures, in which m=n=o=p=1:

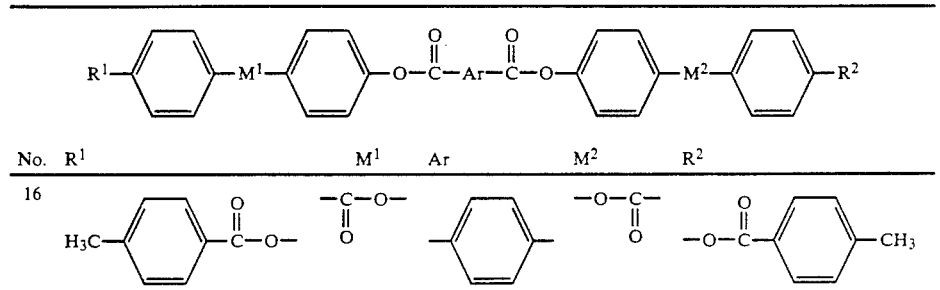

-continued

| No. | R¹ | M¹ | Ar | M² | R² |
|---|---|---|---|---|---|
| 17 | ⌬–C(=O)–O | –C(=O)–O– | ⌬ | –O–C(=O)– | –O–C(=O)–⌬ |
| 18 | ⌬–C(–O–)=O | –O–C(=O)– | ⌬ | –C(=O)–O– | –C(=O)–O–⌬ |
| 19 | CH₃–⌬–O–C(=O)– | –O–C(=O)– | ⌬ | –C(=O)–O– | –C(=O)–O–⌬ |

Preferred compounds corresponding to formula (I) are those which contain from 3 to 15 aromatic partial structures, the group —Ar— being selected as one partial structure irrespective of whether it is mononuclear or polynuclear. Particularly preferred compounds corresponding to formula (I) are those which contain from 3 to 11 aromatic partial structures, the group —Ar— again being selected as one aromatic partial structure irrespective of whether it is mononuclear or polynuclear. Especially preferred compounds corresponding to formula (I) are those which contain from 3 to 7 aromatic partial structures as defined above.

In purely formal terms, the compounds corresponding to formula (I) may be produced from the following structural elements (II) to (VIII):

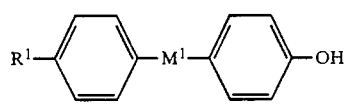  (II)

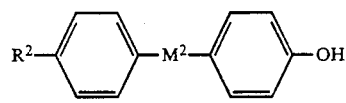  (III)

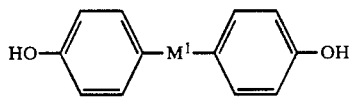  (IV)

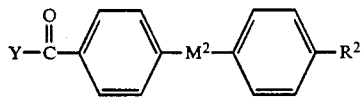  (V)

In formulae (II) and (VII), M¹, M² and Ar are as defined for formula (I) and R¹ and R² are also as defined for formula (I), although R¹ and R² may additionally have the function of a readily movable protective group such as, for example, $$Z-\overset{O}{\underset{\|}{C}}-Ar-\overset{O}{\underset{\|}{C}}-Z \quad (VI)$$

  (VII)

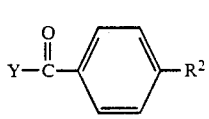

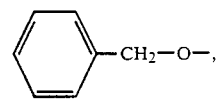  and $R_3Si-O-$

Y and Z are reactive residues of aromatic carboxylic acid derivatives, for example Cl, Br or anhydride groups. Reactive in this context means the ability of the carboxylic acid derivatives to form esters with phenols or phenolates.

In addition to the defined function of a reactive residue in the production of intermediate stages, Y may also be a readily removable protective group, for example

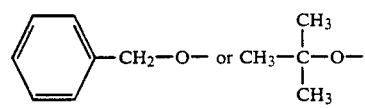

In more specific terms, the compounds of formula (I) according to the invention are prepared by reaction of the phenolic compounds (II) and/or (III) and/or (IV) or alkali salts thereof with the reactive derivatives of aromatic carboxylic acids (V) and/or (VI) and/or (VII); these esterification reactions may be carried out by known methods, for example in accordance with Houben-Weyl, Methoden der organischem Chemie, Supplementary Volume E5.

This esterification reaction is preferably carried out in a basic medium, suitable bases being in particular alkali metal hydroxides, such as sodium or potassium hydroxide, alkali metal carbonates or hydrogen carbonates, such as sodium carbonate, sodium hydrogen carbonate, potassium carbonate or potassium hydrogen carbonate, alkali metal acetates, such as sodium or potassium acetate, alkali metal hydroxides, such as calcium hydroxide, or organic bases, such as triethylamine, diisopropyl ettylamine, 1,8-bis-(dimethylamino)-naphthalene, pyridine, lutidine, collidine, quinoline or N,N-dimethylaniline.

The esterifications are advantageously carried out in the presence of an inert solvent. Particularly suitable inert solvents are ethers, such as diethylether, di-n-butylether, tetrahydrofuran, dioxane or anisole; ketones, such as acetone, butanone, 3-pentanone or cyclohexanone; amides, such as dimethylformamide or hexamethylphosphoric acid triamide; hydrocarbons, such as benzene, toluene or xylene; halogenated hydrocarbons, such as carbon tetrachloride or tetrachloroethylene; and sulfoxides, such as dimethylsulfoxide or sulfolan. An excess of the organic base used, for example pyridine, quinoline, N,N-dimethylaniline or triethylamine, may also occasionally be used as solvent for the esterification. In principle, the esterification reactions according to the invention may also be carried out in the absence of the auxiliary base, for example simply by heating the components in an inert solvent.

The reaction temperature is normally in the range from $-50°$ C. to $+200°$ C. and preferably in the range from $-20°$ C. to $160°$ C. At these temperatures, the esterification reactions are generally over after 15 minutes to 48 hours.

Accordingly, the present invention also relates to a process for the production of the compounds corresponding formula (I) which is characterized in that phenolic compounds corresponding to formulae (II) and/or (III) and/or (IV) or alkali salts thereof are esterified by know processes with reactive derivatives of aromatic carboxylic acids corresponding to formulae (V) and/or (VI) and/or (VII) in dependence upon the functionality of the reactants (II) to (VII), taking into account the protective groups to be used, and in dependence upon the values to be obtained for the indices "m", "n", "o" and "p" in formula (I).

In one preferred embodiment of the process according to the invention, the phenolic compounds are suspended in an organic solvent, for example in diethylether, dioxane, tetrahydrofuran or $CH_2Cl_2$, with an equimolar quantity of organic base, for example triethylamine, pyridine or N,N-dimethylaniline, and the corresponding aromatic carboxylic acid halide, preferably the corresponding aromatic carboxylic acid chloride, is added dropwise with stirring in the calculated quantities to the resulting suspension at temperatures in the range from $-10°$ C. to $+10°$ C. The reaction mixture is then stirred for about 10 to 16 hours at around $20°$ C., the organic solvent is removed in vacuo and, to separate the hydrohalides of the organic bases, the residue is taken up in water, the product is filtered under suction and then washed with water until a neutral reaction is obtained.

In another variant of the process according to the invention, the phenolic compounds are dissolved in equimolar quantities of 10% aqueous NaOH or KOH solution, the corresponding aromatic carboxylic acid halide is added with cooling in the calculated quantities, the reaction product precipitated is filtered off under suction, washed with water until neutral and dried.

The phenolic compounds corresponding to formula (II) are either known from the literature (see for example J. B. Schroeder, J. Org. Chem. 38 3160 (1973) and J. P. von Meter, B. H. Klandermann, Mol. Cryst. Liquid Cryst. 1973, 22, 285) or may be obtained by known methods, for example as follows:

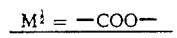

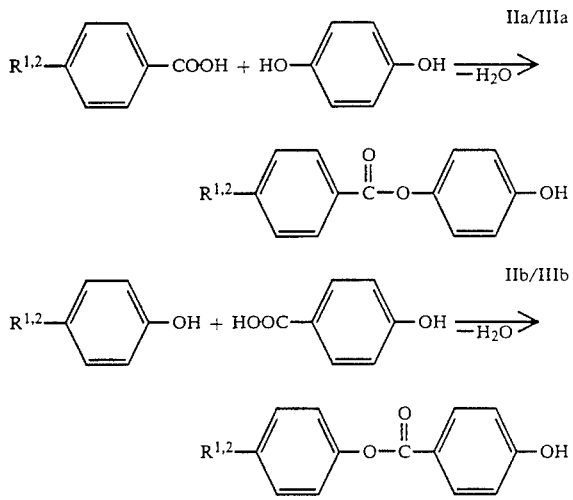

These direct esterification reactions are carried out in a solvent suitable as water entraining agent using acidic catalysts by methods known from the literature (cf. for example Houben-Weyl, Methoden der organischen Chemic, Supplementary Volume E5). Suitable solvents are, for example, toluene, xylene, chlorobenzene, dichlorobenzene.

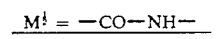

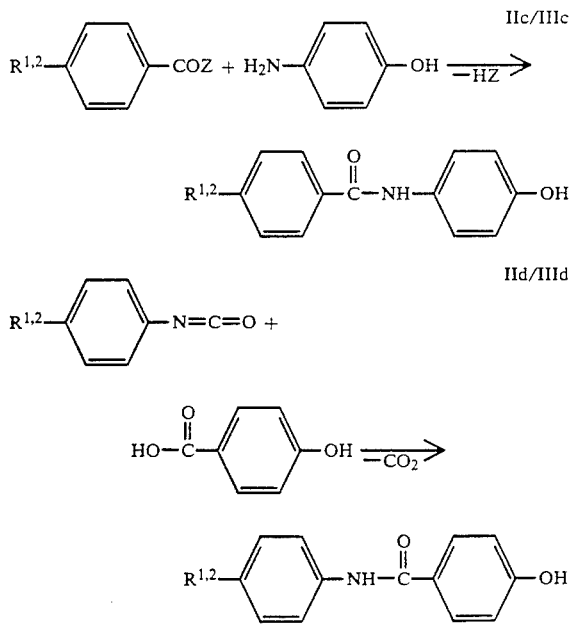

Production methods are described, for example, by M. Ueda in J. Org. Chem. 50, 760.

In special cases, it is advisable to block the phenolic OH group by a protective group.

Suitable methods for carrying out both the amide-forming reaction and also the blocking of phenolic OH groups are described in the literature, for example in Houben-Weyl, Methoden der organischen Chemie, or W. R. Krigbaum in Euro. Polym. J. Vol. 20, 225 (1984).

The reaction of isocyanates and carboxylic acids is also known and is described in Houben-Weyl, Methoden der organischen Chemie E5.

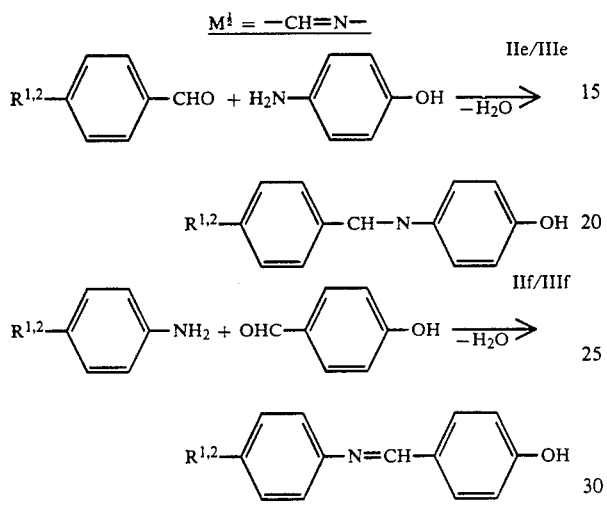

The synthesis of amines by condensation of amides with aldehydes is known from the literature and is described in Houben-Weyl, Methoden der organischen Chemie and in H. Ringsdorf, Makromol. Chem. 30, 36.

Compound (VI) is prepared by direct esterification of p-hydroxybenzoic acid with hydroquinone in accordance with DE-OS 3 622 611.

The reactive derivatives of the aromatic carboxylic acids (V) are prepared as follows:

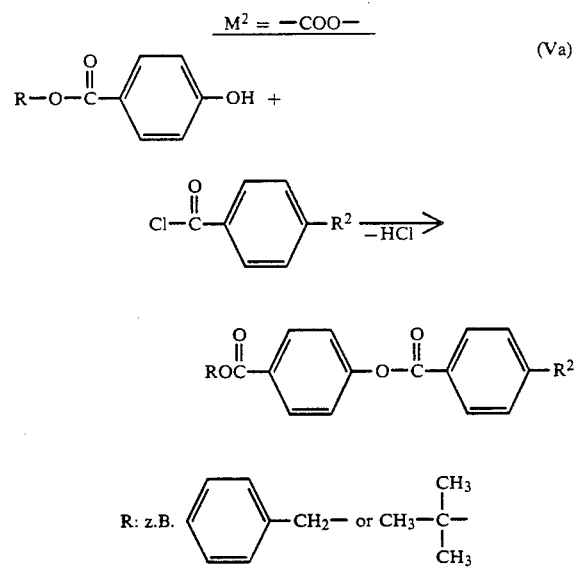

Another synthesis route comprises 1) elimination of the protective group R by hydrogenation or thermolysis and 2) conversion of the free carboxyl group into a reactive form

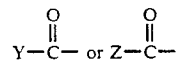

by methods known from the literature.

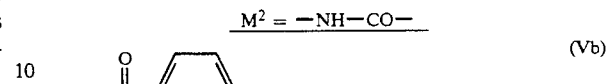

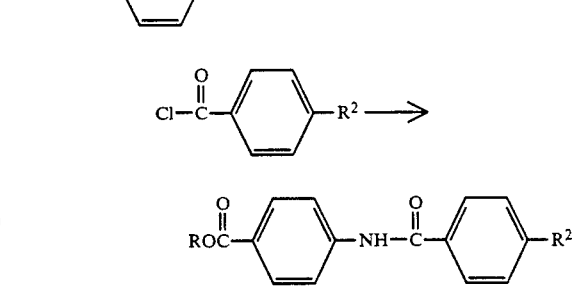

The other synthesis route corresponds to that for compound (Va).

R has the same meaning as in (Va). In addition, the production of (Vb) is described in O. Exner, Coll. Czech. Chem. Commun., 1970, 1371.

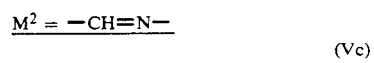

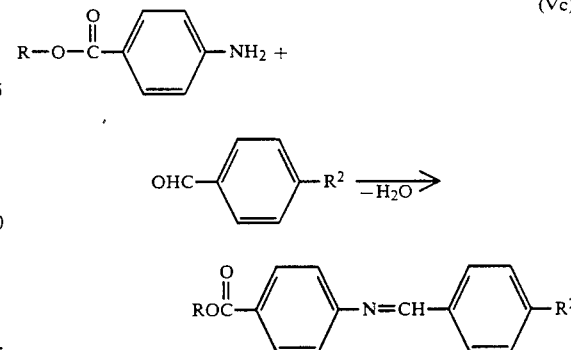

R has the same meaning as in (Va). The other synthesis route corresponds to that for compound (Va).

The reactive derivatives of the aromatic dicarboxylic acids (VI) and aromatic carboxylic acids (VII) are known from the literature and are prepared by known reactions. Reactive carboxylic acid derivatives (VII) containing protective groups, for example 4-carbobenzoxybenzoic acid derivatives, are prepared in accordance with W. R. Krigbaum, Euro. Polym. J. 20, 225 (1984).

The production of the liquid crystalline compounds according to the invention from the basic structural elements (II), (III), (IV), (V), (VI), (VII) and other auxiliaries is outlined briefly in the following.

3-Nuclear compounds (m=0, n=1, o=1, p=0)

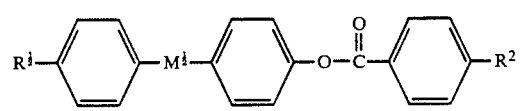

are prepared from phenols of type (II) or (III) by esterification with reactive aromatic carboxylic acids.

4-Nuclear compound: is obtained by esterification of the ester biphenol (IV) with 2 mol of a reactive aromatic carboxylic acid derivative:

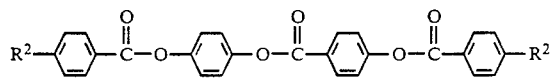

(m=o, n=1, o=1, p=o) or from the phenols (II) or (III) by esterification with the reactive carboxylic acid derivative (V)

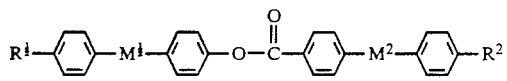

(m=o, n=1, o=1, p=1)

5-nuclear compounds (m=1, n=1, o=1, p=1) are obtained by esterification of the phenols (II) and (III) with reactive aromatic dicarboxylic acids:

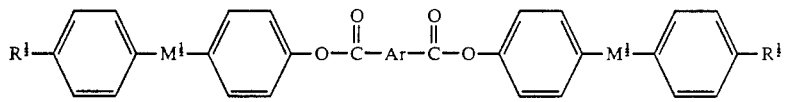

6-nuclear compounds (m=0, n=1, o=1, p=1): are obtained from 4-nuclear compounds of the following type:

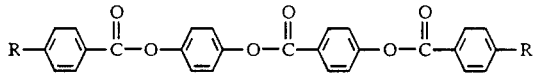

mit R = 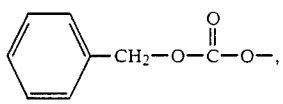

by the synthesis sequence 1. hydrogenation (elimination of the protective group with release of the bisphenol) and 2. esterification of the two phenolic OH groups with an aromatic carboxylic acid derivative (VII)

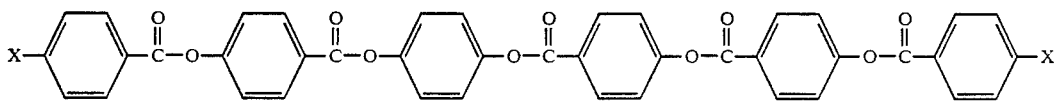

7-nuclear compounds (m=n=o=p=1): may be obtained from 3-nuclear compounds, in which $R^{1,2}=X$,

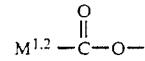

and the ring substituent $R^2$ is a protective group of the type

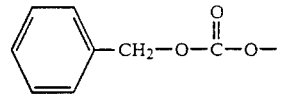

by the following synthesis sequence:
1) removal of the protective group by hydrogenation (release of the phenolic OH function)
2) reaction with a reactive aromatic dicarboxylic acid derivative (VI)

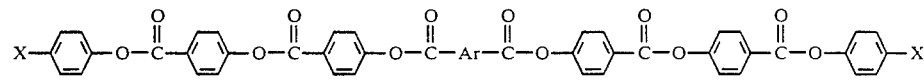

7-Nuclear compounds may be obtained from 5- nuclear compounds, in which $R^1$ represents the protective group

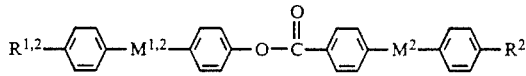

by the same synthesis sequence:
1) removal of the protective group by hydrogenation and
2) reaction of the phenolic OH group with a reactive aromatic carboxylic acid derivative (VII):

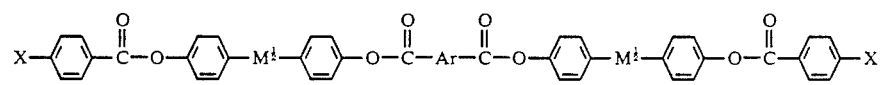

8-nuclear compounds (m=0, n=2, o=1, p=1) are obtained from 4-nuclear compounds of the type

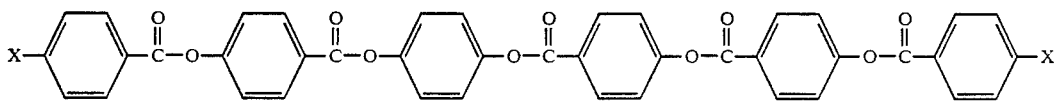

mit $R^{1,2}$ und

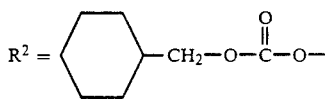

by the following synthesis sequence:
1) removal of the protective group by hydrogenation
2) reaction of the phenolic OH group with reactive carboxylic acid derivatives corresponding to formula (V)

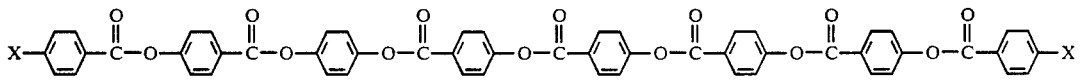

9-nuclear compounds (m=1, n=1, o=2, p=1) are obtained by consequent utilization of the protective group technique via the following synthesis sequence. Esterification of phenols of type (II) or (III), in which $R^1$ or $R^2$ is a protective group:

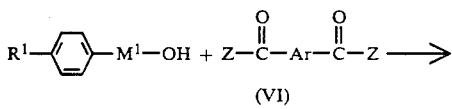

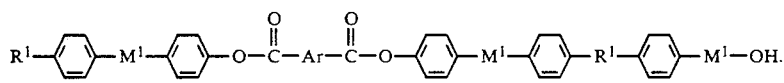

After elimination of the protective group by hydrogenation, bisphenol is esterified together with a 3-nuclear phenol

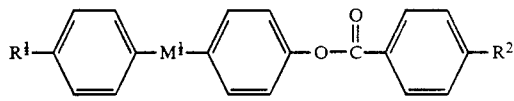

(prepared by removal of the protective group $R^1$:

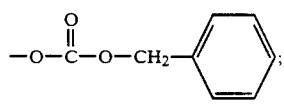

and another reactive aromatic dicarboxylic acid derivative (VI) to form the corresponding 9-nuclear compound:

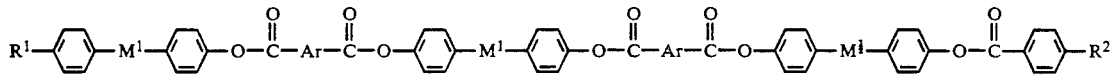

Correspondingly higher-nuclear compounds containing more than 9 aromatic ring systems may be analogously synthesized.

The compounds corresponding to formula (I), including compounds 1, 2 and 10, are suitable as additives for thermoplastic, aromatic polycarbonates, for thermoplastic polycarbonates, for thermoplastic, aromatic polyester carbonates and for thermoplastic, aromatic polyesters, producing both an improvement in the rigidity and flexural strength of these thermoplastics and also an improvement in their processability. No such use is either mentioned or even suggested in the literature references which describe compounds 1, 2 and 10.

The effect of the compounds corresponding to formula (I) is surprising insofar as it is known from JA 51 071 346 that aromatic esters having the following structure

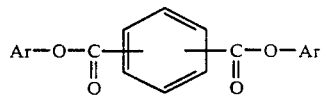

in which
Ar is an aromatic group optionally substituted by halogen, $C_{1-10}$ alkyl or aralkyl,
may be used as plasticizers for aromatic polycarbonates in quantities of from 0.01 to 10% by weight.

The addition of liquid crystalline polymers to thermoplastics is known (cf. for example EP-OS 0 030 417). However, a disadvantage is in general the limited compatibility of the thermoplastics with liquid crystalline polymers, the transparency of the thermoplastics above all being impaired or totally eliminated.

Infusible, whisker-like poly-(p-oxybenzoate) crystals are described as a reinforcing component in U.S. Pat. No. 4,673,724. On account of their very high melting or softening points, however, these crystals are very difficult to produce and are particularly incompatible with other polymers.

An improvement in the compatibility between the liquid crystalline phase and the thermoplastic matrix is described in EP 0 071 968 for partially crystalline polymers, such as polyalkylene terephthalate, the better compatibility of the phases being achieved by using only oligomers based on terephthalic acid, 2,6-naphthalene dicarboxylic acid and diphenols, such as 3,3',5,5'-tetramethyl-4,4'-dihydroxydiphenyl, and trimethyl hydroquinone having molecular weights of from 2,000 to 10,000 as the liquid crystalline components. Commensurate with the low molecular weights of the liquid crystalline components, the reinforcing effects obtained are only moderate. Thus, although the elasticity modulus of polyethylene terephthalate fibers is increased, their tensile strength is reduced.

Mixtures of liquid crystalline polymers and amorphous thermoplastics produced in situ are also known (cf. for example G. Kiss, Polymer Engineering & Science, 27, pages 410-423 (1987). Mixtures such as these are attended by the disadvantage that the reinforcing effects obtainable depend largely upon the mixing conditions and the processing conditions are often difficult to reproduce.

In addition, in the production of composites of the type in question, the mixing components differ greatly in their melt viscosities under processing conditions, so that only a limited number of suitable polymers is available for the production of the composites.

Chemically reactive, liquid crystalline, aromatic esters which condense into the polymer chain through transesterification at a relatively high temperature have been described as processing aids for conventional thermoplastices such as aromatic polyesters, or liquid crystalline polymers which are difficult to process as thermoplastics. However, the incorporation of the aromatic, liquid crystalline esters in the polymer chain leads to a chemical change in the thermoplastics. The disadvantage of this is that, depending on the processing conditions, different incorporation ratios and, hence, non-reproducible properties are obtained.

Liquid crystalline compounds are described in EP-OS 0 256 470 (Le A 24 738-EP) as chain-extending agents for the production of polyurethanes.

The quantities of compounds corresponding to formula (I) for modifying the thermoplastic aromatic polycarbonates, the thermoplastic aromatic polyester carbonates and the thermoplastic aromatic polyesters amount to between 0.1% by weight and 30% by weight, preferably to between 0.5% by weight and 25% by weight and more preferably to between 1% by weight and 15% by weight, based in each case on the total weight of compounds corresponding to formula (I) and thermoplastic polycarbonate, thermoplastic polyester carbonate and thermoplastic polyester.

Accordingly, the present invention also relates to the use of the compounds corresponding to formula (I) for modifying thermoplastic aromatic polycarbonates and-/or thermoplastic aromatic polyester carbonates and/or thermoplastic aromatic polyesters.

Thermoplastic aromatic polycarbonates in the context of the present invention are the polycondensates obtainable by reaction of diphenols, particularly dihydroxydiarylalkanes, with phosgene or diesters of carbonic acid; in addition to the unsubstituted dihydroxydiarylalkares, those of which the aryl groups bear methyl groups or halogen atoms in the o- and/or m-position to the hydroxyl group are also suitable. Branched polycarbonates are also suitable. Monophenols for example are used as chain terminators while trisphenols or tetraphenols for example are used as branching agents.

The polycarbonates have average weight average molecular weights $\bar{M}w$ of from 10,000 to 300,000, preferably from 150,000 to 250,000 on the one hand and from 20,000 to 40,000 on the other hand, as determined by gel permeation chromatography or by measurement of the relative viscosity in $CH_2Cl_2$ at 25° C. and at a concentration of 0.5 g per 100 ml.

Suitable diphenols are, for example, hydroquinone; resorcinol; 4,4'-dihydroxydiphenyl; bis-(hydroxyphenyl)alkanes, such as for example $C_{1-8}$ alkylene or $C_{2-8}$ alkylidene bisphenols; bis-(hydroxyphenyl)-cycloalkanes, such as for example $C_{5-15}$ cycloalkylene or $C_{5-15}$ cycloalkylidene bisphenols; bis-(hydroxyphenyl)-sulfides, ethers, ketones, sulfoxides or sulfones; also $\alpha,\alpha'$-bis-(hydroxyphenyl)-di-isopropylbenzene and the corresponding nucleus-alkylated or nucleus-halogenated compounds.

Preferred polycarbonates are those based on bis-(4-hydroxyphenyl)-2,2-propane (bisphenol A), bis-(4-hydroxy-3,5-dichlorophenyl)-2,2-propane (tetrachlorobisphenol A), bis-(4-hydroxy-3,5-dibromophenyl)-2,2-propane (tetrabromobisphenol A), bis-(4-hydroxy-3,5-dimethylphenyl)-2,2-propane (tetramethylbisphenol A), bis-(4-hydroxyphenyl)-1,1-cycloyhexane (bisphenol Z) and on trinuclear bisphenols, such as $\alpha,\alpha'$-bis-(4-hydroxyphenyl)-p-diisopropylbenzene. Other suitable diphenols and the production of the polycarbonates are described, for example, in U.S. Pat. Nos. 3,028,365; 3,062,781 and 3,879,347.

Branched polycarbonates are described, for example, in U.S. Pat. No. 4,185,009 and in DE-PS 2 500 092.

Thermoplastic aromatic polyesters in the context of the present invention are those based on diphenols, aromatic dicarboxylic acid dichlorides, chain terminators and, optionally, branching agents.

Suitable diphenols are the compounds mentioned above for the production of the polycarbonates.

Monophenols are used as chain terminators while trisphenols and tetraphenols are used as branching agents.

In addition, aromatic tricarboxylic acid trichlorides or aromatic tetracarboxylic acid tetrachlorides or acid chlorides of even higher aromatic carboxylic acids may also be used with advantage as branching agents.

They are used in quantities of from 0.01 to 1 mol-%, based on the aromatic dicarboxylic acid dichlorides used, whereas phenolic branching agents are used in quantities of from 0.01 to 1 mol-%, based on the diphenols used for the production of the aromatic polyester.

Branching agents for the production of aromatic polyesters are described, for example, in DE-OS 2 940 024, pages 9/10 (Le A 19 932).

Suitable aromatic dicarboxylic acid dichlorides are terephthalic acid dichloride, isophthalic acid dichloride, o-phthalic acid dichloride, diphenyldicarboxylic acid dichloride, diphenylether dicarboxylic acid dichloride, naphthalene dicarboxylic acid dichloride and mixtures thereof.

Preferred mixtures are those of terephthalic acid dichlorides with isophthalic dichlorides in a ratio of from 20:1 to 1:20 and more especially in a ratio of 7:3 to 3:7.

The production of the aromatic polyesters from acid chlorides, diphenols, chain terminators and, optionally, branching agents is preferably carried out in known manner by interfacial polycondensation (cf. for example DE-OS 2 940 024).

Thermoplastic aromatic polyester carbonates in the context of the present invention are those obtainable in known manner from diphenols, phosgene, aromatic dicarboxylic acid dichlorides, chain terminators and, optionally, branching agents.

Polyester carbonates and their production are known (cf. for example EP-OS 0 036 080, U.S. Pat. No. 3,169,121 and DE-OS 2 714 544).

Suitable diphenols are those already mentioned for the production of the polycarbonates.

Suitable aromatic dicarboxylic acid dichlorides are those already mentioned for the production of the aromatic polyesters, mixtures of terephthalic acid dichlorides with isophthalic acid dichlorides in the mixing ratios already mentioned again being particularly suitable.

Suitable chain terminators are the monophenols used for the production of the polycarbonates and polyesters.

Suitable branching agents are the more than dihydric phenols and more than difunctional aromatic carboxylic acid chlorides mentioned above in regard to the aromatic polyesters.

The aromatic polyester carbonates in the context of the invention contain up to about 80 mol-% and preferably up to about 50 mol-% carbonate groups, based on the total mols carbonate groups and aromatic carboxylic acid ester groups.

Both the ester component and the carbonate component of the aromatic polyester carbonates according to the invention may be present in the polycondensate in the form of blocks or in statistical distribution.

The relative solution viscosity ($\eta_{rel}$) of the aromatic polyesters and polyester carbonates is in the range from 1.18 to 1.4 and preferably in the range from 1.22 to 1.3 (as measured on solutions of 0.5 g polyester carbonate in 100 ml $CH_2Cl_2$ solution at 25° C.).

The compounds corresponding to formula (I) are preferably incorporated in the solution of the polycarbonates or polyester carbonates or polyesters which is formed in the production of the polycarbonates or polyester carbonates or polyesters by the interfacial process or which may readily be prepared from granulates of these plastics using convential solvents. The solutions may then be worked up in known manner, for example in evaporation extruders, and the modified thermoplastics may be isolated in known manner, for example in granulate form. The solutions may also be directly cast to form films.

The compounds corresponding to formula (I) may also be incorporated in a melt of the polycarbonates or polyester carbonates or polyesters, for example using extruders, preferably twin-screw extruders; the modified thermoplastics may again be isolated in known manner, for example as granulate.

Accordingly, the present invention also relates to a process for the incorporation of compounds corresponding to formula (I) in thermoplastic aromatic polycarbonates and/or thermoplastic aromatic polyester carbonates and/or thermoplastic aromatic polyesters, characterized in that the compounds corresponding to formula (I) are added in quantities of from 0.1% by weight to 30% by weight, preferably in quantities of from 0.5% by weight to 25% by weight and more preferably in quantities of from 1% by weight to 15% by weight to solutions of thermoplastic:, aromatic polycarbonates and/or thermoplastic aromatic polyester carbonates and/or thermoplastic aromatic polyesters in the solvents typically used for these thermoplastics and the resulting solutions are subsequently worked up in known manner or the compounds corresponding to formula I are incorporated in the quantities mentioned above in melts of the polycarbonates and/or polyester carbonates and/or polyesters and the modified thermoplastics are isolated in known manner.

The present invention also relates to thermoplastic aromatic polycarbonates and/or aromatic polyester carbonates and/or aromatic polyesters, characterized in that they contain the compounds corresponding to formula (I) in quantities of from 0.1% by weight to 30% by weight, preferably in quantities of from 0.5% by weight to 25% by weight and more preferably in quantities of from 1% by weight to 15% by weight.

The polycarbonates, polyester carbonates and polyesters modified by the addition in accordance with the invention of the compounds corresponding to formula (I) combine the advantageous properties already mentioned with a high degree of transparency, particularly in cases where compounds of formula (I) containing 3 to 5 aromatic partial structures (—Ar— again counting as an aromatic partial structure) are used.

The polycarbonates, polyester carbonates and polyesters modified in accordance with the invention by the addition of the compounds corresponding to formula (I) may also contain the usual stabilizers suitable for the thermoplastics mentioned in the quantities normally used for these thermoplastics.

The polycarbonates, polyester carbonates and polyesters modified in accordance with the invention by the addition of the compounds corresponding to formula (I) are suitable for the production of moldings by injection molding and extrusion, preferably for applications requiring high rigidity, high dimensional stability ant high surface quality.

One particularly preferred application of the transparent molding compounds according to the invention is in the production of moldings for recording acoustic and/or optical information (for example compact discs).

EXAMPLES

A) Production of 4-hydroxyphenyl-4-hydroxybenzoate (intermediate stage for the production of compounds corresponding to formula (I)).

A)a) Produced from 4-hydroxybenzoic acid with introduction of the carbobenzoxy group as a protective group and esterification with hydroquinone by the Schotten-Baumann method, followed by elimination of the protective group. Melting point: 245°–246° C. (cf. W. R. Krigbaum, Eur. Polym. J. 20, page 225 (1984)).

A)b) Direct esterification in accordance with DE-OS 3 622 611. 138.1 g p-hydroxybenzoic acid and 110.1 g hydroquinone are suspended with 2 g boric acid and 2.5 g sulfuric acid in 900 ml xylene and the resulting suspension is heated under reflux until the elimination of water is complete. The product is filtered under suction, dried and washed with dilute sodium bicarbonate solution, redried and dissolved in 100 ml acetone. The product is then filtered off while still hot from undissolved constituents and precipitated from water, filtered under suction and dried. Yield: 182 g. Melting point: 245°–247° C.

EXAMPLE 1

1-(4-methoxybenzyloxy)-4-(4-methylbenzoyloxy)-benzene

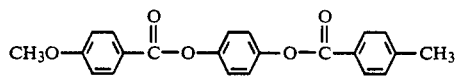

1a) Preparation of 4-methoxybenzoic acid-4-hydroxyphenyl ester 912 g p-methoxybenzoic acid and 660 g hydroquinone are heated under reflux in the presence of 12 g boric acid and ml sulfuric acid (98%) until the elimination of water is over. After cooling, the crystals precipitating are filtered under suction, washed and redried. Yield: 1250 g colorless crystals. Melting point: 162°–165° C. Mp. J. Org. Chem. 37, 1425 (1972) 156° C.

1b) 122.1 g of this product are suspended with 43.5 g distilled pyridine in 500 absolute methylene chloride and 76.8 g p-methylbenzoic acid chloride added to the resulting suspension while cooling with ice. The reaction mixture is stirred for 14 h at room temperature and diluted with 500 ml methylene chloride. The reaction mixture is washed twice with 200 ml cold 5% hydrochloric acid and twice with 300 ml water. The organic phase is dried over sodium sulfate, the drying agent is filtered off and the product concentrated. The residue is suspended in cold methanol, filtered under suction and dried. Yield 135 g (≈74% of the theoretical). The liquid crystalline behavior under a polarization microscope is in the range from 190° to 290° C.

EXAMPLE 2

1-(4-methoxyphenyloxycarbonyl)-4-(methoxybenzoyloxy)-benzene

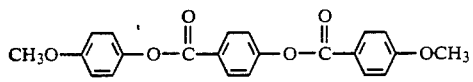

was prepared in accordance with Example 1b) from the known p-methoxyphenyl ester of 4-hydroxybenzoic acid (cf. J. P. van Meten, B. H. Klanderman, Mol Cryst., Liquid Cryst. 1973, Vol. 22, pages 285 et seq.) and p-methoxybenzoic acid chloride Yield: 142 g (94% of the theoretical).

The presence of a liquid crystalline phase was confirmed by polarization microscope in the temperature range from 150° to 300° C.

EXAMPLE 3

1-(4-methoxyphenyloxycarbonyl)-4-(4-methylbenzoyloxy)-benzene. 4-Methoxyphenyl-4-hydroxybenzoate was reacted with 4-methylbenzoic acid chloride as in Example 1b. Yield: 11 g (91% of the theoretical). Liquid crystalline behavior was observed under a polarization microscope in the temperature range from 180° to 330° C.

EXAMPLE 4

1-(4-methylphenyloxycarbonyl)-4-(4-methoxybenzoyloxy)-benzene is prepared as in Example 1b from 4-methylphenyl-4-hydroxybenzoate and 4-methoxybenzoyl chloride. Yield: 128 g. Liquid crystalline behavior was observed in the temperature range from 180° to 330° C.

EXAMPLE 5

4-Benzoyloxybenzoic acid-4-benzoyloxyphenyl ester is prepared as in Example 1b from 4-hydroxyphenyl-4-hydroxybenzoate and benzoic acid chloride. Yield: 530 g (80% of the theoretical). A liquid-crystalline phase was observed under a polarization microscope in the temperature range from 190° to 350° C.

EXAMPLE 6

4-(4-methylbenzoyloxy)-benzoicacid-4-4-methylbenzoyloxy)phenyl ester 345.3 g 4-hydroxyphenyl-4-hydroxybenzoate are suspended with 249 g pyridine in 3000 ml methylene chloride and 460 g methylbenzoic acid chloride are added to the resulting suspension over a period of 3 h at T=° C. The reaction mixture is stirred for 14 h at room temperature. The solvent is distilled off in vacuo and the residue stirred up with 1.4 1 5% hydrochloric acid. The insoluble product is filtered under suction, washed with water until neutral and dried. Yield: 643 g (85% of the theoretical). A liquid crystalline phase is observed under a polarization microscope in the temperature range from 190 to 350 C.

EXAMPLE 7

4-(4-methoxybenzoyloxy)-benzoic acid-4-(4-methoxybenzoyloxy)-phenyl ester is prepared as in Example 5 from 4-hydroxyphenyl-4-hydroxybenzoate and 4-methoxybenzoic acid chloride. Yield: 420 g (84% of the theoretical). The presence of a liquid crystalline phase is confirmed by polarization microscope in the temperature range from 180° to 330° C.

EXAMPLE 8

4-(4-trifluoromethylbenzoyloxy)-benzoic acid-4-(4-trifluoromethylbenzoyloxy)-phenyl ester is prepared as in Example 6 from 4-hydroxyphenyl-4-hydroxybenzoate and 4-trifluoromethylbenzoyl chloride. Yield: 12.9 g (80% of the theoretical). A liquid crystalline phase was observed under a polarization microscope in the temperature range from 180° to 340° C.

EXAMPLE 9

4-(4-chlorobenzoyloxy)-benzoic acid-4-(4-chlorobenzoyloxy)-phenyl ester is prepared as in Example 5 from 4-hydroxyphenyl-4-hydroxybenzoate and p-chlorobenzoic acid chloride. Yield: 250 g (98% of the theoretical). A liquid crystalline phase is observed under a polarization microscope in the temperature range from 160° to 350° C.

EXAMPLE 10

4,4'-bis-(phenyloxycarbonyl)-diphenylteraphthalate is prepared as in Example 6 from phenyl-4-hydroxybenzoate and terephthalic acid dichloride. Yield: 140 g (±75% of the theoretical).

EXAMPLE 11

4,4'-bis-(4-methylphenyloxycarbonyl)-diphenyl terephthalate is prepared as in Example 1/5 from 4-methylphenyl-4-hydroxybenzoate and terephthalic acid dichloride. Yield:

EXAMPLE 12

4,4'-bis-(4-methoxyphenyloxycarbonyl)-diphenyl terephthalate is produced as in Example 15 from 4-methoxyphenyl-4-hydroxybenzoate and terephthalic acid dichloride. Yield:

EXAMPLE 13

4,4'-bis-(benzoyloxy)-diphenyl terephthalate is produced as in Example 6 from 4-hydroxyphenylbenzoate and terephthalic acid dichloride. Yield: 80 g (±84% of the theoretical).

EXAMPLE 14

4,4'-bis-(4-methylbenzoyloxy)-diphenyl terephthalate is produced as in Example 6 from 4-hydroxyphenyl-4-methyl-benzoate and terephthalic acid dichloride. Yield: 73 g (±87% of the theoretical).

EXAMPLE 15

4,4'-bis-(4-methoxybenzoyloxy)-diphenyl terephthalate is produced as in Example 1/5 from 4-hydroxyphenyl-4-methoxybenzoate. Yield: 95 g (±88% of the theoretical).

EXAMPLE 16

4-Hydroxyphenyl-4-(4-methylbenzoyloxy)-benzoate is reacted as in Example 6 with terephthalic acid dichloride. Yield: 45 g ($\doteq$65% of the theoretical).

1,4-bis-[[(4-methylbenzoyloxy)-4-benzoyloxy]-4-phenyloxy-carbonyl]-benzene

TABLE 1

| Product | Pol. microscope Mp. °C. | DSC $T_u$ °C. |
|---|---|---|
| 1 | 195–285 | 198–291 |
| 3 | 135–295 | 141–305 |
| 6 | 194–300 | 201–280 |
| 11 | 165–270 | 169–278 |
| 12 | 250–325 | 249–330 |
| 15 | 230–315 | 232–310 |

II. Production of the thermoplastic molding compounds

The thermoplastic molding compounds are produced by two methods:
a) addition of the liquid crystalline compound to the polymer solution before working up and
b) compounding of the amorphous, aromatic polyesters, polyester carbonates and polycarbonates with the liquid crystalline compounds in the melt.

The materials used in the Examples and Comparison Examples are described in the following.

The relative solution viscosities shown were measured in methylene chloride at 25.C for a polymer concentration of 5 g/l.

1. Polycarbonate (PC) of bisphenol A, relative solution viscosity $\eta_{rel}=1.280$.
2. Polyester carbonate (APEC) of bisphenol A, ester content 80% by weight, and equimolar quantities of iso- and terephthalic acid prepared in accordance with EP 0 036 080, relative solution viscosity $\eta_{rel}$ 1.294.
3. Polyester (APE) of bisphenol A and equimolar quantities of iso- and terephthalic acid prepared in accordance with DOS 2 940 024, relative solution viscosity $\eta_{rel}=1.267$.

Impact strength $a_n$ and notched impact strength $a_k$ were tested on 80×10×4 mm test specimens in accordance with DIN 53 453 (ISO/R 179) at 23° C. using 10 test specimens for each test.

Flexural strength was determined on 80×10×4 mm test specimens in accordance with DIN 53 452 (ISO/R 178). The elasticity modulus in tension was determined in accordance DIN 53 547.

Tensile strength was determined on so-called dumb-bell-shaped test specimens (0.7-fold) in accordance with DIN 53 455. The elasticity modulus in tension was determined in accordance with DIN 53 457. Melt flow behavior was evaluated by measurement of melt viscosity. Unless otherwise indicated, the nozzle had a length-to-thickness ratio (L:D) of 30:1.

The composition and properties of the thermoplastic molding compounds are shown in Table 2.

TABLE 2

Thermoplastic molding compounds based on the polycarbonate Makrolon 2800

| PC 2800 (%) | LC-comp. Ex. | Prod. (%) | method | Melt viscosity T = 33° C.; –1000s$^{-1}$ | $T_{proc.}$ | $a_n$ (kJ/m$^2$) | $\delta_R$ (MPa) | $\epsilon_R$ (%) | E-M-T (MPa) | $\delta_B$ (MPa) | $\epsilon_B$ (%) | E-M-B (MPa) |
|---|---|---|---|---|---|---|---|---|---|---|---|---|
| 100 | — | 0 | a | 320 | 300 | u.b. | 65 | 80 | 2400 | 95 | 7.4 | 2200 |
| 100 | — | 0 | b | 300 | 320 | u.b. | 64 | 80 | 2570 | 98 | 7.2 | 2300 |
| 95 | 1 | 5 | a | 80 | 260 | 7 × u.b. 3 × 130 | 67 | 65 | 2940 | 120 | 6.8 | 2710 |
| 95 | 1 | 5 | b | 75 | 260 | 8 × u.b. 2 × 140 | 65 | 65 | 2960 | 118 | 6.9 | 2740 |
| 90 | 1 | 10 | a | 40 | 240 | 50 | 70 | 45 | 3300 | 123 | 5.3 | 2980 |
| 90 | 1 | 10 | b | 35 | 240 | 57 | 71 | 45 | 3310 | 121 | 5.4 | 2990 |
| 95 | 3 | 5 | b | 120 | 260 | 9 × u.b. 1 × 130 | 72 | 60 | 3010 | 115 | 7.1 | 2720 |
| 95 | 6 | 5 | b | 230 | 280 | 9 × u.b. 1 × 132 | 66 | 80 | 2770 | 105 | 7.3 | 2530 |
| 95 | 6 | 10 | b | 60 | 280 | 8 × u.b. 2 × 100 | ,59 | 80 | 2940 | 111 | 7.0 | 2740 |
| 95 | 15 | 5 | b | 50 | 260 | 9 × u.b. | 70 | 60 | 3050 | 122 | 7.0 | 2730 |

$T_{proc.}$: processing temperature
$a_n$: impact strength
$\delta_R$: ultimate tensile strength
$\epsilon_R$: elongation at break
E-M-T: elasticity modulus in tension
$\delta_B$: flexural strength
$\epsilon_B$: outer fiber strain
E-M-B: elasticity modulus in bending

We claim:

1. The thermoplastic aromatic polycarbonates, aromatic polyester carbonates, aromatic polyesters or mixtures, characterized in that they contain the compounds corresponding to formula (I) in quantities of from 1% by weight, wherein formula (I) is

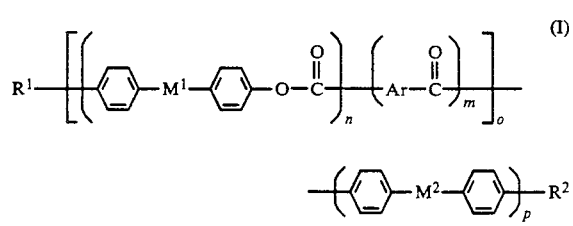

in which
— Ar is an aromatic group which is mononuclear or polynuclear; the polynuclear radical being attached by one bond or annellate R$^1$ and R$^2$ is the same or different and represent a group corresponding to formula (I) a) to 1) below:

(Ia)-(Il)

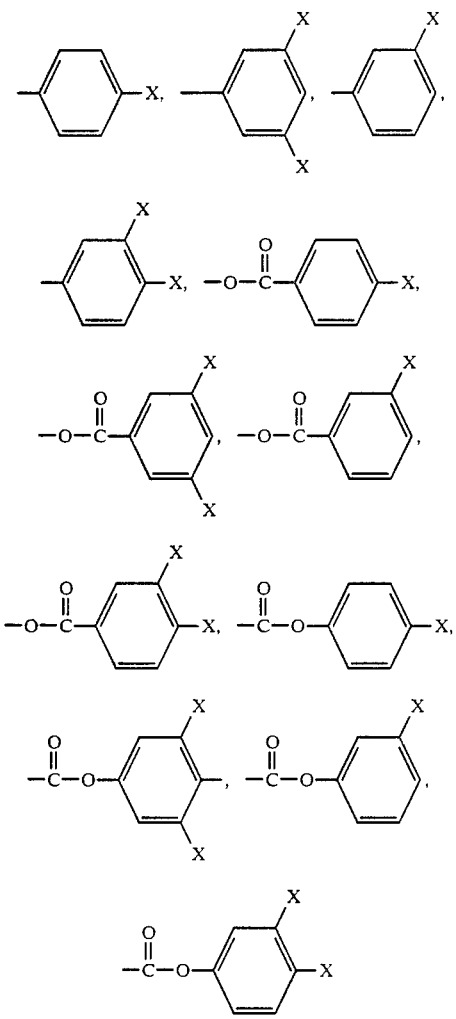

wherein X represents a substituent selected from the group consisting of H, chlorine, O—$C_{1-4}$alkyl, $C_{3-6}$-cycloalkyl, O—$C_{6-14}$aryl, $C_{1-4}$-alkyl, $C_{3-6}$-cycloalkyl, $C_{6-14}$-aryl, fluorinated $C_{1-4}$-alkyl, fluorinated $C_{3-6}$-cycloalkyl and fluorinated $C_{6-14}$-aryl, —$M^1$ and —$M^2$ is the same or different and represent groups with two bonds corresponding to formula

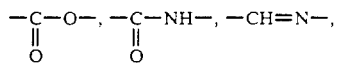

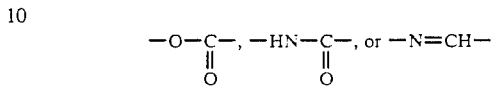

and
m is 1 or 2,
n is 1 or 2,
o is 1 or 2 and
p is 1.

2. Thermoplastic aromatic polycarbonates, aromatic polyester carbonates, aromatic polyesters or mixtures according to claim 1 wherein for formula (I), —Ar— is

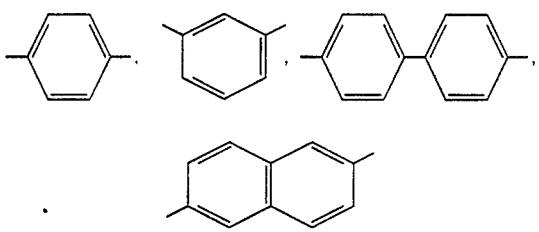

3. Thermoplastic aromatic polycarbonates, aromatic polyester carbonates, aromatic polyesters or mixtures according to claim 1 wherein $M_1$ and $M_2$ are

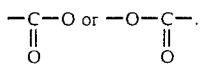

* * * * *